United States Patent
Guo et al.

(10) Patent No.: US 10,503,006 B2
(45) Date of Patent: Dec. 10, 2019

(54) REFLECTIVE DISPLAY AND PREPARATION METHOD THEREOF

(71) Applicant: BOE TECHNOLOGY GROUP CO., LTD., Beijing (CN)

(72) Inventors: Kang Guo, Beijing (CN); Pengxia Liang, Beijing (CN); Xin Gu, Beijing (CN); Xiao Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 119 days.

(21) Appl. No.: 15/571,702

(22) PCT Filed: Jun. 8, 2017

(86) PCT No.: PCT/CN2017/087515
§ 371 (c)(1),
(2) Date: Nov. 3, 2017

(87) PCT Pub. No.: WO2018/076703
PCT Pub. Date: May 3, 2018

(65) Prior Publication Data
US 2019/0129247 A1 May 2, 2019

(30) Foreign Application Priority Data
Oct. 28, 2016 (CN) .......................... 2016 1 0972981

(51) Int. Cl.
*G02B 26/00* (2006.01)
*G02F 1/1335* (2006.01)
(Continued)

(52) U.S. Cl.
CPC ...... *G02F 1/133553* (2013.01); *G02F 1/1333* (2013.01); *G02F 1/133512* (2013.01);
(Continued)

(58) Field of Classification Search
CPC .................. G02F 1/167; G02F 1/1676; G02F 2001/1678; G02F 2203/02; G09G 3/344
(Continued)

(56) References Cited

U.S. PATENT DOCUMENTS 9,140,954 B2    9/2015  Cha et al.
9,835,925 B1 *  12/2017  Bull .................. G02F 1/167
(Continued)

FOREIGN PATENT DOCUMENTS

CN    104317131 A    1/2015
CN    106444206 A    2/2017
(Continued)

OTHER PUBLICATIONS

International Search Report and Written Opinion dated Jul. 27, 2017; PCT/CN2017/087515.

*Primary Examiner* — Mahidere S Sahle
(74) *Attorney, Agent, or Firm* — Ladas & Parry LLP

(57) ABSTRACT

A reflective display includes a first substrate and a second substrate arranged oppositely, a first electrode provided on the first substrate, a transparent dielectric layer arranged on the side of the first substrate opposite to the second substrate, a second electrode provided on the second substrate, and immiscible electrostriction light-absorbing material and transparent liquid filled between the first substrate and the second substrate. The light incident into the reflective display can be totally reflected on the side of the transparent liquid next to the first substrate; the electrostriction light-absorbing material deforms under action of an electric field formed by the first electrode and the second electrode, which enables a spreading area of the side of the transparent liquid next to the first substrate change.

20 Claims, 3 Drawing Sheets

(51) Int. Cl.
  *G02F 1/1343* (2006.01)
  *G02F 1/1333* (2006.01)
  *G02F 1/167* (2019.01)
(52) U.S. Cl.
  CPC ........ *G02F 1/134309* (2013.01); *G02F 1/167* (2013.01); *G02F 2201/08* (2013.01); *G02F 2201/121* (2013.01); *G02F 2201/123* (2013.01)
(58) Field of Classification Search
  USPC ........................................................ 359/296
  See application file for complete search history.

(56) References Cited

U.S. PATENT DOCUMENTS

| | | | |
|---|---|---|---|
| 2008/0076267 A1* | 3/2008 | Oishi ................. | B23K 26/0613 |
| | | | 438/785 |
| 2009/0153943 A1 | 6/2009 | Machida et al. | |
| 2012/0026150 A1* | 2/2012 | Katayama ............ | G02B 26/004 |
| | | | 345/211 |
| 2018/0173074 A1* | 6/2018 | Zhang ..................... | G02F 1/167 |

FOREIGN PATENT DOCUMENTS

| | | |
|---|---|---|
| CN | 206115112 U | 4/2017 |
| KR | 20160090588 A | 8/2016 |

* cited by examiner

REFLECTIVE DISPLAY AND PREPARATION METHOD THEREOF

TECHNICAL FIELD

Embodiments of the present disclosure relates to a reflective display and a preparation method thereof.

BACKGROUND

According to the type of light source and the arrangement of the light source, liquid crystal display devices can be divided into transmissive liquid crystal displays, transflective liquid crystal displays and reflective liquid crystal displays; a dielectric layer is arranged in a reflective liquid crystal display, and the dielectric layer can reflect external ambient light and play the role of a backlight source, and therefore no backlight is needed, and thereby the power consumption is reduced.

At present, typical reflective displays are electronic ink (E-ink) displays. An electronic ink comprises black particles and white particles, and the electronic ink display achieves bright state display by absorbing the white particles in the electronic ink to the display side and achieves dark state display by absorbing the black particles in the electronic ink to the display side.

SUMMARY

At least one embodiment of the present disclosure provides a reflective display, comprising: a first substrate and a second substrate arranged oppositely, a first electrode provided on the first substrate, a transparent dielectric layer arranged on the side of the first substrate opposite to the second substrate, a second electrode provided on the second substrate, and immiscible electrostriction light-absorbing material and transparent liquid filled between the first substrate and the second substrate; the light incident into the reflective display can be totally reflected on the side of the transparent liquid next to the first substrate; the electrostriction light-absorbing material deforms under action of an electric field formed by the first electrode and the second electrode, which allows the spreading area of the transparent liquid on the side next to the first substrate to change.

For example, in the reflective display provided by an embodiment of the present disclosure, the electrostriction light-absorbing material comprises a compound material from polyelectrolyte hydrogel and graphene oxide.

For example, in the reflective display provided by an embodiment of the present disclosure, the mass percentage of the graphene oxide in the electrostriction light-absorbing material is 0.2%~10%.

For example, in the reflective display provided by an embodiment of the present disclosure, the polyelectrolyte hydrogel comprises one or more of polyacrylamide, polyvinylpyrrolidone, and poly(2-acrylamido-2-methyl-1-propanesulfonic acid).

For example, in the reflective display provided by an embodiment of the present disclosure, the material of the transparent dielectric layer is a transparent inorganic material or a transparent organic material, and the refractive indexes of the inorganic material and the organic material are both 1.5~2.0.

For example, in the reflective display provided by an embodiment of the present disclosure, the organic material is polystyrene or acrylic resin; and the inorganic material is silicon dioxide, nitrogen silicon oxide or silicon nitride.

For example, in the reflective display provided by an embodiment of the present disclosure, the transparent dielectric layer possesses a curved surface structure.

For example, in the reflective display provided by an embodiment of the present disclosure, the curved surface structure is a semi-microspheres structure.

For example, in the reflective display provided by an embodiment of the present disclosure, the transparent liquid is acetone, aqueous solution of acetone, or water.

For example, the reflective display provided by an embodiment of the present disclosure further comprises partition walls arranged between the first substrate and the second substrate, the partition walls define a plurality of different units, and the electrostriction light-absorbing material and the transparent liquid are provided in each of the units.

At least one embodiment of the present disclosure also provides a preparation method of a reflective display, comprising: providing a first substrate and a second substrate; forming a transparent dielectric layer and a first electrode on the first substrate; forming a second electrode on the second substrate; assembling the first substrate and the second substrate to form a cell, and filling immiscible electrostriction light-absorbing material and transparent liquid between the first substrate and the second substrate; the light incident into the reflective display can be totally reflected on the side of the transparent liquid next to the first substrate; the electrostriction light-absorbing material deforms under action of an electric field formed by the first electrode and the second electrode, which allows the spreading area of the transparent liquid on the side next to the first substrate to change.

For example, in the preparation method of the reflective display provided by an embodiment of the present disclosure, forming the electrostriction light-absorbing material comprises compounding polyelectrolyte hydrogel and graphene oxide.

For example, in the preparation method of the reflective display provided by an embodiment of the present disclosure, the mass percentage of the graphene oxide in the electrostriction light-absorbing material is 0.2%~10%.

For example, in the preparation method of the reflective display provided by the embodiment of the present disclosure, the transparent dielectric layer is prepared by a nanoimprinting process.

For example, the preparation method of the reflective display provided by an embodiment of the present disclosure further comprises pre-treating the electrostriction light-absorbing material before filling the transparent liquid between the first substrate and the second substrate.

At least one embodiment of the present disclosure provides a reflective display which achieves a dark state display and a bright state display of the display device respectively by utilizing two states of swelling and contraction of the electrostriction light-absorbing material, thereby the problem of the easy aggregation of the black particles in ink in a current reflective display is avoided, and then the display quality of the display device is improved.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not (imitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

The work principle of a reflective display is: when a voltage is applied to the electrode in the reflective display, the black particles in the ink move to the opposite side of the display side, at this time, the bright state display is achieved by utilizing the total reflection produced by the high refractive index of the dielectric layer and the low refractive index of the electronic ink; when another voltage is applied to the electrode in the reflective display, the black particles in the ink move to the surface of the dielectric layer on the display side, in this way, light is absorbed directly, so that the dark state display is achieved.

Figure 1A:
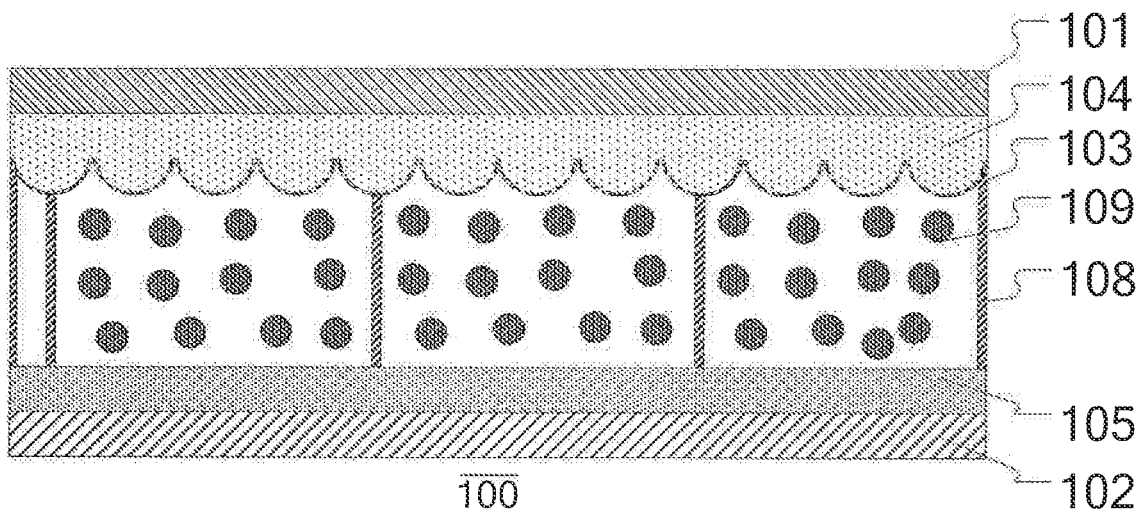
FIG. 1a is a structural schematic diagram of a reflective display in a bright display state.

For example, FIG. 1a is a structural schematic diagram of a reflective display in a bright display state. The reflective display 100 comprises: a first substrate 101 and a second substrate 102 arranged oppositely, a first electrode 103 provided on the first substrate 101, a dielectric layer 104 arranged on the side of the first substrate 101, which side is opposite to the second substrate 102, a second electrode 105 provided on the second substrate 102, and ink 109 (comprising the black particles) filled between the first substrate 101 and the second substrate 102; partition walls 108 are also arranged between the first substrate 101 and the second substrate 102. The dielectric layer 104 is transparent, but its refractive index is higher than the refractive index of the ink 109. The first electrode 103 is also transparent, and the refractive index of the first electrode 103 is the same or basically the same as the refractive index of the dielectric layer 104, which enables that at least the light incident from the front of the reflective display can be subjected to total reflection at the interface between the first electrode 103 and the ink 109; in this way, the bright state display of the reflective display can be achieved.

Figure 1B:
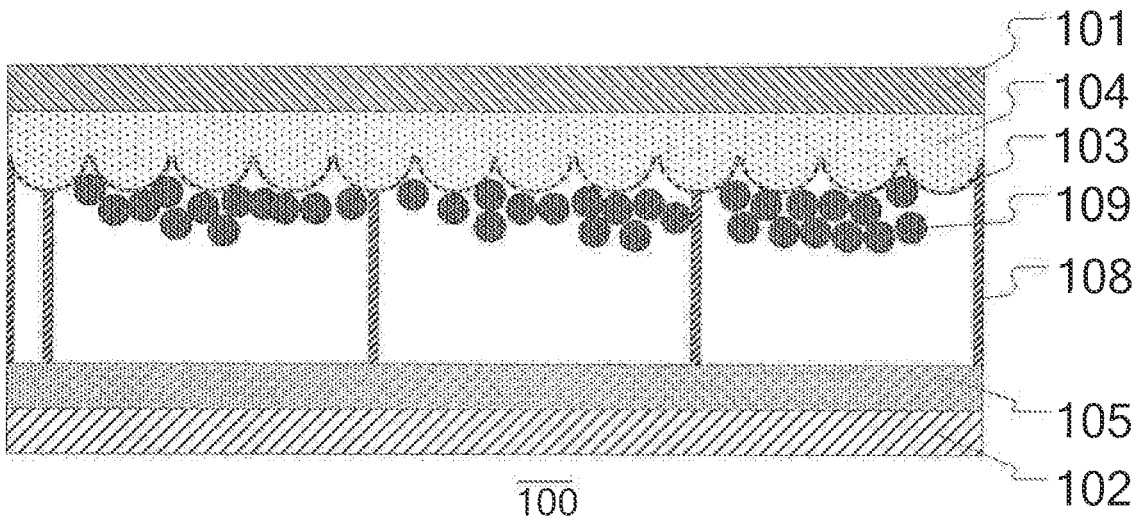
FIG. 1b is a structural schematic diagram of a reflective display in a dark display state.

For example, FIG. 1b is a structural schematic diagram of a reflective display in a dark display state. When a voltage is applied to the first electrode 103 or the second electrode 105 to form an electric field between the first electrode 103 and the second electrode 105, the black particles in the ink 109 are absorbed to the surface of the first electrode 103, thus the condition of total reflection on the surface of the first electrode 103 is destroyed, thereby the incident light can pass through the dielectric layer, but the black particles can absorb the incident light directly, so that the dark state display is achieved.

However, when the current reflective display is in the dark display state, the black particles tend to aggregate easily, which may degrade the display quality.

At least one embodiment of the present disclosure provides a reflective display and its preparation method. The reflective display comprises: a first substrate and a second substrate arranged oppositely, a first electrode provided on the first substrate, a transparent dielectric layer arranged on the side of the first substrate, which side is opposite to the second substrate, a second electrode provided on the second substrate, and immiscible electrostriction light-absorbing material and transparent liquid filled between the first substrate and the second substrate; the light incident into the reflective display can be totally reflected on the surface of the transparent liquid next to the first substrate; the electrostriction light-absorbing material deforms under action of an electric field formed by the first electrode and the second electrode, which allows the spreading area of the transparent liquid on the side next to the first substrate to change.

The reflective display achieves the dark state display and the bright state display of the display device respectively by utilizing two states of swelling and contraction of the electrostriction light-absorbing material, thereby the problem of the easy aggregation of the black particles in the ink in a current reflective display is avoided, and then the display quality of the display is improved.

Figure 2A:
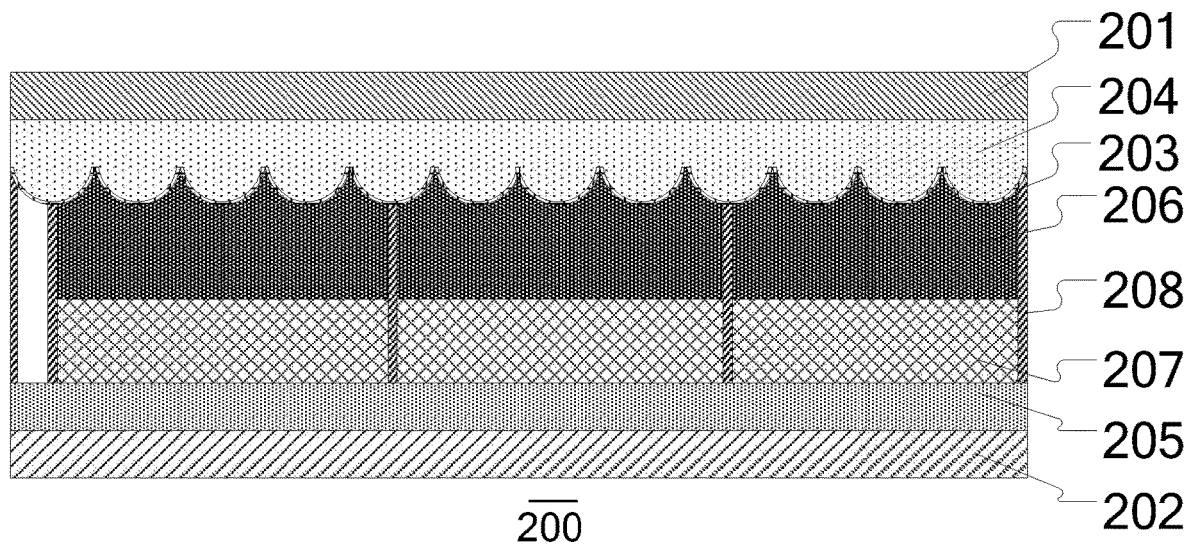
FIG. 2a is a structural schematic diagram of a reflective display provided by an embodiment of the present disclosure in a dark display state.
Figure 2B:
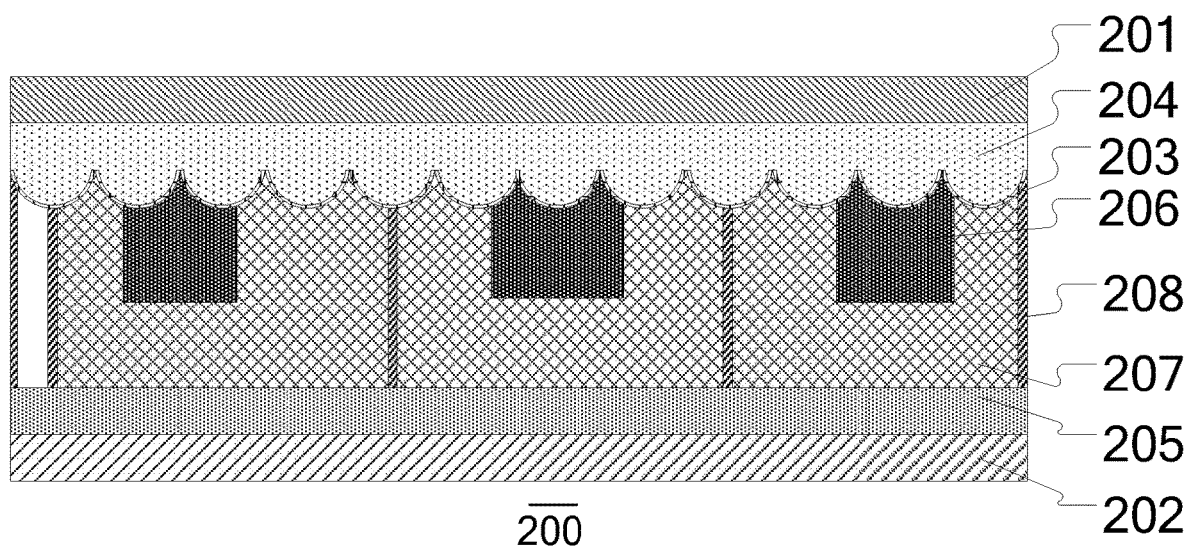
FIG. 2b is a structural schematic diagram of a reflective display provided by an embodiment of the present disclosure in a bright display state.

An embodiment of the present disclosure provides a reflective display, for example, FIG. 2a and FIG. 2b are structural schematic diagrams of the reflective display provided by the embodiment of the present disclosure in a dark display state and a bright state display respectively.

As illustrated in FIG. 2a and FIG. 2b, the reflective display 200 comprises: a first substrate 201 and a second substrate 202 arranged opposite to each other, a first electrode 203 provided on the first substrate 201, a transparent dielectric layer 204 arranged on a side of the first substrate 201, which side is opposite to the second substrate 202, a second electrode 205 provided on the second substrate 202, and immiscible electrostriction light-absorbing material 206 and transparent liquid 207 filled between the first substrate 201 and the second substrate 202. The light incident into the reflective display can be totally reflected on the side of the transparent liquid 207 next to the first substrate 201; the electrostriction light-absorbing material 206 deforms under action of an electric field formed by the first electrode 203 and the second electrode 205, which makes the spreading area of the transparent liquid 207 on the first electrode 203 change on the side next to the first substrate 201.

For example, the first substrate 201 and the second substrate 202 can be an opposite substrate and an array substrate respectively, for example, the opposite substrate can be a color filter substrate. The array substrate comprises pixel driving circuits arranged in an array, for example, each of the pixel driving circuits is used to drive a pixel to control the voltage difference between the first electrode and the second electrode in this pixel correspondingly, thereby a display operation is achieved. When the light is incident from the front of the reflective display, the first substrate is a transparent substrate, for example, a glass substrate.

For example, when the brightness of the ambient light is high, the light incident from the front of the reflective display 200 can be the ambient light, and in this case, the ambient light acts as the light source for display; when the brightness of the ambient light is low, an additional light-emitting device can be provided on the first substrate 201, and the light incident from the front of the reflective display 200 can be the light emitted by the light-emitting device.

For example, the first electrode 203 can be provided on the side of the first substrate 201 next to the second substrate 202 or can be provided on the side of the first substrate 201 far from the second substrate 202. In the following, description all is conducted by taking as an example that the first electrode 203 is provided on the side of the first substrate 201 next to the second substrate 202.

For example, in FIG. 2a and FIG. 2b, the transparent dielectric layer 204 is arranged between the first electrode 203 and the first substrate 201, and the transparent dielectric layer 204 possesses a curved surface structure and possesses a concave-convex surface on its one side which faces the second substrate 202. As shown in FIG. 2a and FIG. 2b, the first electrode 203 is arranged on the side with the curved surface structure of the transparent dielectric layer 204, and the first electrode 203 possesses a corresponding curved surface.

For example, the refractive index of the transparent dielectric layer 204 is higher than the refractive index of the transparent liquid 207, and the refractive index of the first electrode 203 is the same or basically the same as the refractive index of the transparent dielectric layer 204, in this way, when the light incident from the front of the reflective display passes through the first electrode 203 after passing through the transparent dielectric layer 204, the propagation direction of the light is almost unchanged, and the light can be reflected totally at the interface between the first electrode 203 and the transparent liquid 207. The arrangement that the first electrode 203 is on the side of the transparent dielectric layer 204 far from the first substrate 201, i.e., the side next to the second electrode 205, can reduce the power consumption when an electric field is formed by applying a voltage across the first electrode 203 and the second electrode 205.

Figure 3:
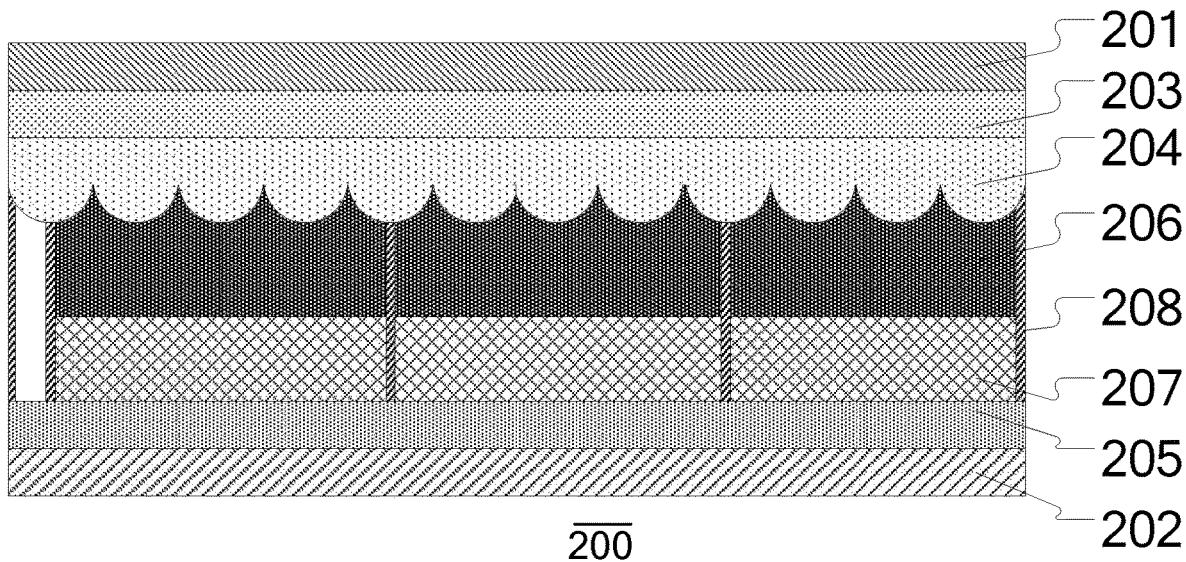
FIG. 3 is a structural schematic diagram of another reflective display provided by an embodiment of the present disclosure.

For example, FIG. 3 is a structural schematic diagram of another reflective display provided by an embodiment of the present disclosure. As illustrated in FIG. 3, the profile of the transparent dielectric layer is provided with a curved surface structure, which enables more light incident from the front of the reflective display to be reflected totally, so that the bright state display is achieved. The first electrode 203 is provided on the side of the transparent dielectric layer 204 next to the first substrate 201, and the first electrode 203 is in a planar structure. The electrostriction light-absorbing material 206 deforms under action of an electric field formed by the first electrode 203 and the second electrode 205, which allows the spreading area of the transparent liquid 207 on the transparent dielectric layer 204 on the side next to the first substrate 201 to change. Compared with the curved surface structure, the process of preparing the first electrode 203 in the planar structure is simpler, which can reduce the difficulty of production and solve the problem of non-uniform electric field.

It should be noted that the reflective displays in FIG. 2a and FIG. 3 are the same except that the relative positions of the first electrode 203 and the transparent dielectric layer 204 are different and the shape of the first electrode 203 is different as well.

For example, in an embodiment of the present disclosure, the curved surface structure as illustrated in FIG. 2a, FIG. 2b and FIG. 3 refers to the structure with a certain radian in the profile of the transparent dielectric layer 204, such as a semi-microspheres structure, or other irregular surfaces, as long as it can be achieved that at least the light incident from the front of the reflective display can be reflected totally at the interface between the transparent dielectric layer 204 or the first electrode 203 and the transparent liquid 207. The semi-microspheres structure, for example, can be the spherical crown of a spherical globe or the spherical crown of an ellipsoid. For example, the curved surface structure can be prepared by a nano-imprinting process, a photolithography process or the like.

For example, the material of the transparent dielectric layer 204 is a transparent inorganic material or a transparent organic material, and the refractive index of the inorganic material or the organic material used to form the transparent dielectric layer 204 is 1.5~2.0. For example, the refractive index of the transparent dielectric layer 204 is 1.5, 1.6, 1.7, 1.8, 1.9 or 2.0.

For example, the organic material used to form the transparent dielectric layer 204 comprises at least one of polystyrene and acrylic resin; the inorganic material used to form the transparent dielectric layer 204 comprises at least one of silicon dioxide, silicon oxynitride or silicon nitride. The transparent dielectric layer 204 can be formed by titanium dioxide material also.

It should be noted that the material used to form the transparent dielectric layer is not limited to the materials described above, as long as the refractive index of the material is 1.5~2.0 and the material has the characteristic of transparence and has a certain hardness.

For example, the thickness of the transparent dielectric layer 204 is 10 μm~20 μm, for example, 10 μm, 15 μm or 20 μm. It should be noted that the thickness of the transparent dielectric layer 204 is the maximum thickness along the direction perpendicular to the first substrate.

For example, the first electrode 203 and the second electrode 205 are both formed by a transparent conductive material, and for example, the transparent conductive material can be indium tin oxide (ITO), indium zinc oxide (IZO) or the like.

For example, the thicknesses of the first electrode 203 and the second electrode 205 are 100 nm~300 nm, for example, 100 nm, 200 nm, 250 nm or 300 nm.

For example, the refractive index of the first electrode 203 is 1.5~2.0, the refractive index of the transparent dielectric layer 204 is higher than the refractive index of the transparent liquid 207, and in FIG. 2a and FIG. 2b, the refractive index of the first electrode 203 is the same or basically the same as the refractive index of the transparent dielectric layer 204.

For example, one of the first electrode and the second electrode can be the common electrode, the other is the pixel electrode, and the pixel electrode is connected with the driving circuit in the array substrate and is applied data voltages. Different data voltages produce different voltage differences between the first electrode and the second electrode, which enables the spreading area of electrostriction light-absorbing material on the side next to the first substrate to be different, thus different display gray levels are achieved.

For example, in the reflective display provided by an embodiment of the present disclosure, the electrostriction light-absorbing material 206 comprises a compound material from polyelectrolyte hydrogel and graphene oxide. Polyelectrolyte hydrogel and graphene oxide are bonded by intermolecular forces.

For example, the mass percentage of graphene oxide in the electrostriction light-absorbing material 206 may be 0.2%~10%.

For example, the polyelectrolyte hydrogel comprises one or more of polyacrylamide, polyvinylpyrrolidone, and poly (2-acrylamido-2-methyl-1-propanesulfonic acid).

It should be noted that the electrostriction light-absorbing material is not limited to the compound materials described above, as long as the compound material can deform under action of an electric field, has the ability of absorbing light, and is not immiscible with the corresponding transparent liquid.

For example, in an embodiment of the present disclosure, the transparent liquid is acetone, aqueous solution of acetone, or water. For example, the refractive index of acetone is 1.36, and the refractive index of water is 1.33. This can satisfy the condition that when the light is incident from the transparent dielectric layer 204 or the first electrode 203 into the transparent liquid 207, the process of light entering an optically thinner medium from an optically denser medium occurs, and during this process, as long as the incident angle is greater than the critical angle, the light can be reflected totally at the interface between the transparent dielectric layer 204 and the transparent liquid 207, or be reflected totally at the interface between the first electrode 203 and the transparent liquid 207.

It should be noted that the transparent liquid is not limited to acetone, aqueous solution of acetone, or water which is described above, it also can be other solvent, as long as it has the characteristic of transparence, the refractive index of it is lower than the refractive index of the corresponding transparent dielectric layer to create the total reflection material, and it is immiscible with the corresponding transparent liquid.

It should also be noted that in an embodiment of the present disclosure, compared with a transparent liquid, the electrostriction light-absorbing material compounded from polyelectrolyte hydrogel and graphene oxide experiences, for example, a paste formation treatment or a gelation formation treatment, the paste-like or gel electrostriction light-absorbing material has a stronger acting force with the first electrode or the transparent dielectric layer, and the paste-like or gel electrostriction light absorbing material is immiscible with the transparent liquid. When the electrostriction material is stretched, it completely covers the first electrode or the transparent dielectric layer; after the electrostriction material shrinks, part of the electrostriction material still contacts the first electrode or the transparent dielectric layer.

For example, as shown in FIG. 2a, FIG. 2b and FIG. 3, the reflective display provided by an embodiment of the present disclosure further comprises partition walls 208 (or the pixel definition layer) arranged between the first substrate 201 and the second substrate 202. The partition walls 208 define a plurality of different units, and the electrostriction light-absorbing material 206 and the transparent liquid 207 are provided in each of the units. The partition wall 208 can prevent the crosstalk between the electrostriction light-absorbing material 206 and the transparent liquid 207 in different units, so that the swelling and contraction states of the electrostriction light-absorbing material can be better achieved. For example, in order to prevent the first electrode 203 from being electrically conducted with the second electrode 205, the material of the partition wall 208 is an insulation material, such as polyimide, resin, silica or the like.

Figure 4:
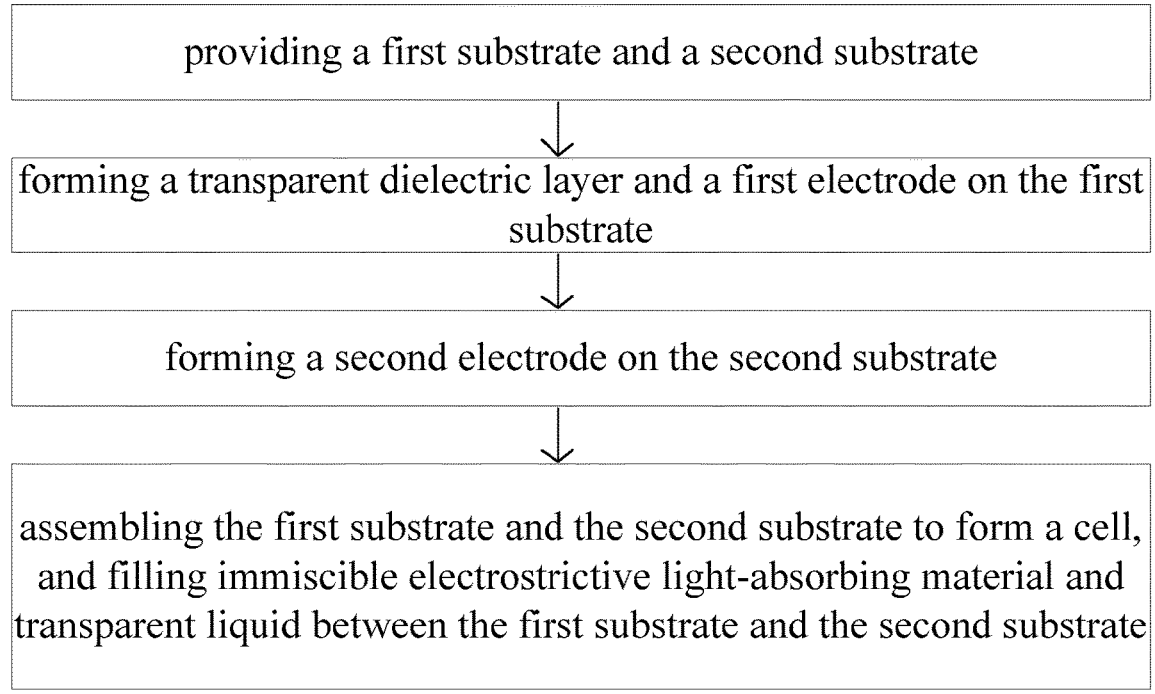
FIG. 4 is a preparation process diagram of a reflective display provided by an embodiment of the present disclosure.

At least one embodiment of the present disclosure also provides a preparation method of a reflective display, for example, FIG. 4 is a preparation process diagram of a reflective display provided by an embodiment of the present disclosure. The preparation method comprises the following steps.

Step 1: providing a first substrate and a second substrate.

For example, the first substrate and the second substrate can be an opposite substrate and an array substrate respectively, for example, the opposite substrate can be a color filter substrate. If light can enter the reflective display, the first substrate is a transparent substrate, for example, a glass substrate.

Step 2: forming a transparent dielectric layer and a first electrode on the first substrate.

For example, the transparent dielectric layer can be formed first and then the first electrode is formed on the first substrate, or the first electrode is formed first and then the transparent dielectric layer is formed on the first substrate, and the structure of the reflective display formed can be seen in FIG. 2a and FIG. 3 respectively.

The transparent dielectric layer is arranged between the first electrode and the first substrate, and the transparent dielectric layer possesses a curved surface structure. The surface of the transparent dielectric layer is formed to be a curved surface structure, which enables more light incident from the front of the reflective display to be reflected totally.

For example, the curved surface structure in an embodiment of the present disclosure refers to the structure with a certain radian in the profile of the transparent dielectric layer, such as semi-microspheres structure. The semi-microspheres structure, for example, can be the spherical crown of a spherical globe or the spherical crown of an ellipsoid.

For example, the curved surface structure can be prepared by a nano-imprinting process, a photolithography process.

For example, the material of the transparent dielectric layer is a transparent inorganic material or a transparent organic material, and the refractive index of the inorganic material or the organic material used to form the transparent dielectric layer is 1.5~2.0.

For example, the first electrode is provided on the side of the transparent dielectric layer with the curved surface structure, the first electrode also possesses a curved surface structure; alternatively the first electrode is provided on the side of the transparent dielectric layer next to the first substrate, and the first electrode is in a planar structure.

Step 3: forming a second electrode on the second substrate.

For example, one of the first electrode and the second electrode can be the common electrode, and the other can be the pixel electrode accordingly.

For example, the first electrode and the second electrode are both formed of a transparent conductive material, and for example, the transparent conductive material can be indium tin oxide (ITO), indium zinc oxide (IZO) or the like.

For example, after the second electrode is formed on the second substrate, the partition walls used to define the pixel regions can be formed further so as to allow more accurately filling of electrostriction light-absorbing material and transparent liquid. The partition walls, for example, can be formed by an organic or inorganic insulation material by means of a photolithography process or a nano-imprinting process etc.

It should be noted that there is no preset order among step 1, step 2, and step 3, and step 3 can be carried out simultaneously with step 1 or step 2.

Step 4: assembling the first substrate and the second substrate to form a cell, filling immiscible electrostriction light-absorbing material and transparent liquid between the first substrate and the second substrate. For example, the first substrate and the second substrate can be bonded together by a sealant to achieve the cell assemblage.

For example, the electrostriction light-absorbing material can deforms under action of an electric field formed by the first electrode and the second electrode, which allows the spreading area of the transparent liquid on the transparent dielectric layer or the first electrode to change.

For example, the electrostriction light-absorbing material comprises a compound material from polyelectrolyte hydrogel and graphene oxide. Polyelectrolyte hydrogel and graphene oxide are bonded by intermolecular forces. For example, the mass percentage of the graphene oxide in the electrostriction light-absorbing material is 0.2%~10%.

For example, the transparent liquid is acetone, aqueous solution of acetone, or water, the refractive index of the transparent dielectric layer is higher than the refractive index of the transparent liquid, which enables that at least the light incident from the front of the reflective display can be reflected totally at the interface between the transparent dielectric layer and the transparent liquid. The refractive index of the first electrode is the same or basically the same as the refractive index of the transparent dielectric layer, which enables that the light incident into the reflective display can also be reflected totally at the interface between the First electrode and the transparent liquid.

For example, the preparation method further comprises pre-treating the electrostriction light-absorbing material before filling the transparent liquid between the first substrate and the second substrate. The pre-treating comprises a paste preparation treatment or a gelation paste treatment upon the liquid-like electrostriction light-absorbing material, so that when the transparent liquid is filled, the electrostriction light-absorbing material can be layered better with respect to the transparent liquid, and the electrostriction light-absorbing material has stronger interaction with the transparent dielectric layer or the first electrode after the pretreatment.

A reflective display and a preparation method thereof provided by the embodiments of the present disclosure have at least one of the following beneficial effects: the reflective display achieves a dark state display and a bright state display of the display device respectively by utilizing the two states of swelling and contraction of the electrostriction light-absorbing material, thereby the problem of the easy aggregation of the black particles in the ink in a current reflective display is avoided, and then the display quality of the display is improved.

The following is to be noted:

(1) Only the structures involved in the embodiments of the present disclosure are involved in the embodiments and drawings of the present disclosure, other structures can refer to usual designs.

(2) In order to clearly illustrate, a layer or an area may be amplified in the drawings of the embodiments of the present disclosure. It is to be understood that, when a member such as a layer, a film, an area or a substrate is located or disposed on or below another member, the member can be located or disposed on or below the another member directly, or an intermediate member or intermediate member(s) can be disposed.

(3) The features in different embodiments or different features in the same embodiments can be combined without conflict.

What have been described above are only specific implementations of the present disclosure, the protection scope of the present disclosure is not limited thereto. The protection scope of the present disclosure should be based on the protection scope of the claims.

The application claims priority to the Chinese patent application No. 201610972981.5, filed Oct. 28, 2016, the entire disclosure of which is incorporated herein by reference as part of the present application.

What is claimed is:

1. A reflective display, comprising: a first substrate and a second substrate arranged oppositely, a first electrode provided on the first substrate, a transparent dielectric layer arranged on a side of the first substrate, which side is opposite to the second substrate, a second electrode provided on the second substrate, and immiscible light-proof electrostriction light-absorbing material and transparent liquid filled between the first substrate and the second substrate, wherein the light incident into the reflective display is totally reflected on a side of the transparent liquid next to the first substrate; and the light-proof electrostriction light-absorbing material deforms under action of an electric field formed by the first electrode and the second electrode, which allows a spreading area of the transparent liquid on the side next to the first substrate to change.

2. The reflective display according to claim 1, wherein the light-proof electrostriction light-absorbing material comprises a compound material from polyelectrolyte hydrogel and graphene oxide.

3. The reflective display according to claim 2, wherein a mass percentage of the graphene oxide in the light-proof electrostriction light-absorbing material is 0.2% ~10%.

4. The reflective display according to claim 2, wherein the polyelectrolyte hydrogel comprises one or more of polyacrylamide, polyvinylpyrrolidone, and poly(2-acrylamido-2-methyl-1-propanesulfonic acid).

5. The reflective display according to claim 1, wherein a material of the transparent dielectric layer is a transparent inorganic material or a transparent organic material, and refractive indexes of the inorganic material and the organic material are both 1.5~2.0.

6. The reflective display according to claim 5, wherein the organic material is polystyrene or acrylic resin; and the inorganic material is silicon dioxide, nitrogen silicon oxide or silicon nitride.

7. The reflective display according to claim 5, wherein the transparent dielectric layer possesses a curved surface structure.

8. The reflective display according to claim 7, wherein the curved surface structure is a semi-microspheres structure.

9. The reflective display according to claim 1, wherein the transparent liquid is acetone, aqueous solution of acetone, or water.

10. The reflective display according to claim 1, further comprising partition walls arranged between the first substrate and the second substrate, wherein the partition walls define a plurality of different units, and the light-proof electrostriction light-absorbing material and the transparent liquid are provided in each of the units.

11. A preparation method of a reflective display, comprising:

providing a first substrate and a second substrate;

forming a transparent dielectric layer and a first electrode on the first substrate;

forming a second electrode on the second substrate;

assembling the first substrate and the second substrate to form a cell, and filling immiscible light-proof electrostriction light-absorbing material and transparent liquid between the first substrate and the second substrate;

wherein light incident into the reflective display is totally reflected on a side of the transparent liquid next to the first substrate; and the light-proof electrostriction light-absorbing material deforms under action of an electric field formed by the first electrode and the second electrode, which allows a spreading area of the transparent liquid on the side next to the first substrate to change.

12. The preparation method of a reflective display according to claim 11, wherein forming of the light-proof electrostriction light-absorbing material comprises compounding polyelectrolyte hydrogel and graphene oxide.

13. The preparation method of a reflective display according to claim 12, wherein a mass percentage of the graphene oxide in the light-proof electrostriction light-absorbing material is 0.2%~10%.

14. The preparation method of a reflective display according to claim 11, wherein the transparent dielectric layer is prepared by a nano-imprinting process.

15. The preparation method of a reflective display according to claim 11, further comprising pre-treating the light-proof electrostriction light-absorbing material before filling the transparent liquid between the first substrate and the second substrate.

16. The reflective display according to claim 6, wherein the transparent dielectric layer possesses a curved surface structure.

17. The reflective display according to claim 16, wherein the curved surface structure is a semi-microspheres structure.

18. The reflective display according to claim 2, wherein the transparent liquid is acetone, aqueous solution of acetone, or water.

19. The reflective display according to claim 2, further comprising partition walls arranged between the first substrate and the second substrate, wherein the partition walls define a plurality of different units, and the light-proof electrostriction light-absorbing material and the transparent liquid are provided in each of the units.

20. The reflective display according to claim 2, wherein a material of the transparent dielectric layer is a transparent inorganic material or a transparent organic material, and refractive indexes of the inorganic material and the organic material are both 1.5~2.0.

* * * * *